(12) United States Patent
Pan et al.

(10) Patent No.: US 10,371,982 B2
(45) Date of Patent: Aug. 6, 2019

(54) DISPLAY PANEL (71) Applicant: Himax Display, Inc., Tainan (TW)

(72) Inventors: Po-Hung Pan, Tainan (TW);
Hsing-Lung Wang, Tainan (TW);
Jia-Lung Tsai, Tainan (TW);
Tung-Feng Wu, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 15/631,844

(22) Filed: Jun. 23, 2017

(65) Prior Publication Data

US 2018/0374402 A1 Dec. 27, 2018

(51) Int. Cl.
*G02F 1/1333* (2006.01)
*G02F 1/1335* (2006.01)

(52) U.S. Cl.
CPC .. *G02F 1/133509* (2013.01); *G02F 1/133345* (2013.01); *G02F 1/133512* (2013.01); *G02F 2001/133354* (2013.01)

(58) Field of Classification Search
CPC .......... G09F 9/375; G02F 1/13338; G02F 2001/133354; G02F 2001/133334; G02F 1/133514; G02F 1/133512; G02F 1/136209; G02F 1/13473; G02F 1/133371; G02F 2001/136222; G02F 2001/136218; G02F 1/133345; G02F 2201/42; G02F 1/133509; G09G 5/003; H01J 11/44; H01J 2211/444;
(Continued)

(56) References Cited

U.S. PATENT DOCUMENTS 5,837,374 A    11/1998  Hirayama et al.
2001/0012078 A1*  8/2001  Hira ..................... G02B 3/0031
                                                                 349/95

(Continued)

FOREIGN PATENT DOCUMENTS

CN    104090419      10/2014
JP    07043521 A *   2/1995
(Continued)

OTHER PUBLICATIONS

English translation of JP-07043521-A, Title: Color Filter, Author: Haneda, Akio; Date of publication: Feb. 1995 (Year: 1995).*
(Continued)

*Primary Examiner* — Edward J Glick
*Assistant Examiner* — Shan Liu
(74) *Attorney, Agent, or Firm* — J.C. Patents (57) ABSTRACT A display panel according to an embodiment is provided and includes a top substrate having an outer surface; a display layer covered by the top substrate; a patterned light shielding layer disposed on the outer surface of the top substrate and located within the first region; and a patterned oxide layer disposed on the outer surface of the top substrate. The outer surface comprises a first region and a second region beside the first region. An edge of the patterned light shielding layer at least partially overlaps a boundary between the first region and the second region. The patterned oxide layer is located within one of the first region and the second region while exposes the other of the first region and the second region.

13 Claims, 4 Drawing Sheets (58) Field of Classification Search
CPC . H01J 2329/323; H01J 29/327; G01N 27/205
USPC .......................................... 349/106–111, 138
See application file for complete search history.

(56) References Cited

U.S. PATENT DOCUMENTS

| | | | | |
|---|---|---|---|---|
| 2010/0038601 | A1* | 2/2010 | Zhou | H01B 1/20 252/502 |
| 2010/0067132 | A1* | 3/2010 | Nakamura | B41J 2/14 359/891 |
| 2011/0176095 | A1* | 7/2011 | Fujita | B41M 3/003 349/106 |
| 2012/0275009 | A1* | 11/2012 | Vermeulen | G02B 26/005 359/290 |
| 2013/0128192 | A1* | 5/2013 | Ishikawa | G02F 1/133512 349/96 |
| 2014/0335316 | A1* | 11/2014 | Fukushima | B32B 7/12 428/161 |
| 2015/0140889 | A1* | 5/2015 | Lee | G02F 1/1303 445/24 |
| 2016/0252752 | A1* | 9/2016 | Busman | G02B 1/04 257/40 |
| 2017/0190942 | A1* | 7/2017 | Kim | B32B 9/045 |
| 2018/0259816 | A1* | 9/2018 | Chen | G02F 1/136209 |

FOREIGN PATENT DOCUMENTS

| | | |
|---|---|---|
| JP | 2015536484 | 12/2015 |
| TW | 201027143 | 7/2010 |
| TW | 201621419 | 6/2016 |

OTHER PUBLICATIONS

"Office Action of Taiwan Counterpart Application", dated May 8, 2018, p. 1-p. 4.

* cited by examiner

DISPLAY PANEL

BACKGROUND OF THE INVENTION

1. Field of the Invention

The present invention generally relates to an electronic device, in particular, to a display panel.

2. Description of Related Art

For demarcating and defining the display region, a display panel is usually disposed with a patterned light shielding layer such as black matrix, wherein the patterned light shielding layer may have a frame-like pattern or a matrix-like pattern and the region surrounded by the frame-like pattern or the matrix-like pattern is served as the display region. The black matrix layer may not only define the display region but also prevent unwanted light leakage.

For a liquid crystal display panel, a display layer including liquid crystal material is disposed between a top substrate and a bottom substrate while the top substrate and the bottom substrate are attached or assembled with each other via a sealant or an adhesive. In a case the sealant or the adhesive is a light curable material, the top substrate needs to be transparent for a curing light passing through it and irradiating the light curable sealant or adhesive. In addition, after the assembly of the top substrate and the bottom substrate, a light shielding layer is formed on the top surface of the top substrate via a wet process such as an ink-jet printing process, a screen printing process, an APR printing process or the like. The light shielding layer is disposed on the non-display region to shield the unwanted light leakage and help to improve the display contrast. However, the pattern of the light shielding layer formed by using a wet process is usually not sharp, which may affect the predetermined light shielding effect of the light shielding layer.

SUMMARY OF THE INVENTION

Accordingly, the present invention is directed to a display panel including a light shielding layer with a sharp pattern.

According to an embodiment, a display panel including a top substrate having an outer surface; a display layer covered by the top substrate; a patterned light shielding layer disposed on the outer surface of the top substrate and located within the first region; and a patterned oxide layer disposed on the outer surface of the top substrate. The outer surface comprises a first region and a second region beside the first region. An edge of the patterned light shielding layer at least partially overlaps a boundary between the first region and the second region. The patterned oxide layer is located within one of the first and the second regions while exposes the other of the first region and the second region.

According to an embodiment, the patterned oxide layer is located in the first region and disposed between the top substrate and the patterned light shielding layer.

According to an embodiment, the patterned oxide layer has a modified surface in contact with the patterned light shielding layer.

According to an embodiment, the outer surface of the top substrate is modified at the second region to form a modified outer surface, and the modified outer surface is more hydrophobic than the modified surface of the patterned oxide layer.

According to an embodiment, the outer surface of the top substrate is further modified at the first region, the modified outer surface is located at both the second region and the first region, and the patterned oxide layer is disposed on the modified outer surface at the first region.

According to an embodiment, the patterned oxide layer is in direct contact with the patterned light shielding layer.

According to an embodiment, an underlying oxide layer is further disposed on the outer surface of the top substrate and located at the second region.

According to an embodiment, the underlying oxide layer exposes the first region.

According to an embodiment, the underlying oxide layer is further disposed at the first region and is disposed between the top substrate and the patterned oxide layer.

According to an embodiment, the underlying oxide layer has a modified surface with hydrophobic property.

According to an embodiment, a material of the patterned oxide layer is different from a material of the underlying oxide layer.

According to an embodiment, the outer surface of the top substrate is modified to form a modified outer surface and the patterned oxide layer is disposed on the modified outer surface.

According to an embodiment, a material of the patterned oxide layer includes an oxide having surface hydroxyl groups.

According to an embodiment, the oxide includes at least one selected from thermally evaporated $SiO_x$, ITO, $TiO_2$, and $Al_2O_3$.

According to an embodiment, the patterned oxide layer is located in the second region and exposes the first region.

According to an embodiment, the patterned oxide layer has a modified surface with hydrophobic property.

According to an embodiment, the outer surface is modified at the first region to form a modified outer surface, and the modified outer surface is less hydrophobic than the modified surface of the patterned oxide.

According to an embodiment, the patterned light shielding layer is in direct contact with the top substrate at the first region.

According to an embodiment, a bottom substrate is further disposed to be opposite to the top substrate, wherein the display layer is disposed between the top substrate and the bottom substrate.

According to an embodiment, a sealant is further disposed between the top substrate and the bottom substrate and surrounding the display layer.

According to an embodiment, a material of the patterned light shielding layer comprises ink material.

In view of the above, the patterned light shielding layer is disposed on the outer surface of the top substrate at the first region which involves a relatively hydrophilic property compared with the second region. The pattern of the patterned light shielding layer is sharp and has an edge with good linearity in the case that the patterned light shielding layer is formed on the top substrate via wet process. Accordingly, the patterned light shielding layer of the display panel provides desirable light shielding function so as to improve the quality of the display panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
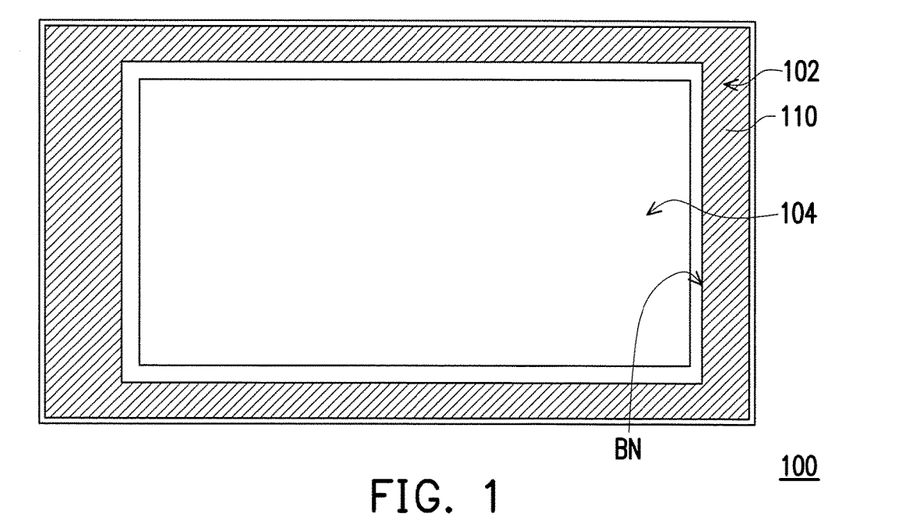
FIG. 1 schematically illustrates a top view of a display panel in accordance with an embodiment of the present disclosure.

FIG. 1 schematically illustrates a top view of a display panel in accordance with an embodiment of the present disclosure. Referring to FIG. 1, the display panel 100 has a first region 102 and a second region 104 beside the first region 102. The first region 102 at the top view has a frame-like pattern and surrounds the second region 104. In addition, the display panel 100 includes a patterned light shielding layer 110 that is located within the first region 102. Specifically, the patterned light shielding layer 110 has a frame-like pattern in the present embodiment. The first region 102 can be considered as the region where the patterned light shielding layer 110 is disposed. An edge of the patterned light shielding layer 110 substantially overlaps a boundary BN between the first region 102 and the second region 104. The patterned light shielding layer 110 has light shielding effect and the display light of the display panel 100 is obstructed or shielded by the patterned light shielding layer 110 so that the displayed image is presented in the second region 104 and the second region 104 can be considered as the display region. In an alternative embodiment, the pattern of the patterned light shielding layer 110 may be other patterns according to the design requirement.

In one embodiment, the patterned light shielding layer 110 is formed at the outer surface of the display panel 100 via a wet process such as an ink-jet printing process, a screen printing process, an APR printing process or the like. For the pattern of the patterned light shielding layer 110 having better edge linearity, the surface on which the patterned light shielding layer 110 is formed can be treated or modified to render the surface at the first region 102 relatively hydrophilic and the surface at the second region 104 relatively hydrophobic.

Figure 2:
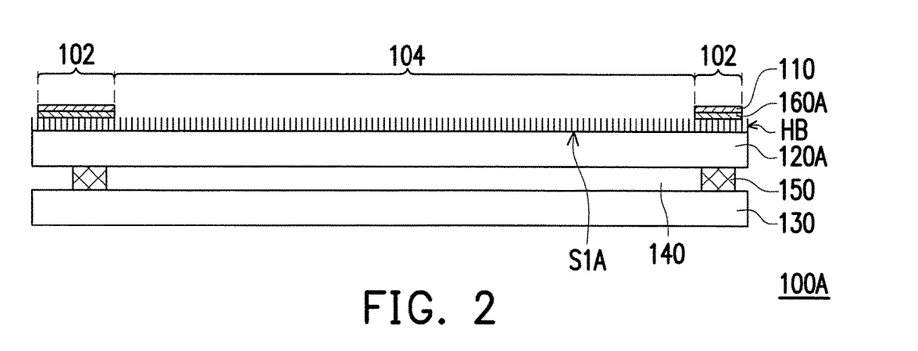
FIGS. 2 to 13 schematically illustrate cross sections of a display panel according to embodiments of the present disclosure.

For example, as shown in FIG. 2 which schematically illustrates a cross section of a display panel according to an embodiment of the present disclosure, a display panel 100A includes the patterned light shielding layer 110, a top substrate 120A, a bottom substrate 130, a display layer 140, a sealant 150, and a patterned oxide layer 160A. The patterned light shielding layer 110 is disposed on the top of the display panel 100, in which the pattern of the patterned light shielding layer 110 in the top view can be substantially the same or similar to the patterned light shielding layer 110 shown in FIG. 1. Specifically, the patterned light shielding layer 110 has a frame-like pattern and the display panel 100A has a first region 102 and a second region 104, similar to the first region 102 and the second region 104 depicted in FIG. 1. In other words, the top view of the display panel 100A is similar to the display panel 100.

The top substrate 120A and the bottom substrate 130 are arranged opposite to each other and the sealant 150 is disposed between the top substrate 120A and the bottom substrate 130. Specifically, the top substrate 120A and the bottom substrate 130 are assembled with each other via the sealant 150. The display layer 140 is disposed between the top substrate 120A and the bottom substrate 130, and is surrounded by the sealant 150. The material of the display layer 140 may be liquid crystal material so that the top substrate 120A, the bottom substrate 130, the display layer 140 and the sealant 150 may serve as a liquid crystal cell.

In the present embodiment, the top substrate 120A has an outer surface S1A and the outer surface S1A can entirely be treated or modified to involve hydrophobic property. For example, the outer surface S1A can be subjected to a silane surface treatment. In a microscopic view, the outer surface S1A can include the hydrophobic material HB thereon for having the hydrophobic property. In an embodiment, the hydrophobic material HB includes silanes, fluorinated silanes, long-chain alcohols or acids. Specifically, the hydrophobic material HB may contain hydroxyl groups to react with the outer surface S1A or the patterned oxide 160A in FIG. 2.

Furthermore, the patterned oxide layer 160A is formed and disposed on the outer surface S1A of the top substrate 120A at the first region 102. The patterned light shielding layer 110 is further disposed on the patterned oxide layer 160A so that the patterned oxide layer 160A is disposed between the patterned light shielding layer 110 and the top substrate 120A and the patterned oxide layer 160A is in direct contact with the patterned light shielding layer 110. A material of the patterned oxide layer 160A includes an oxide having surface hydroxyl groups which may further react with the hydrophobic material HB. More specifically, the oxide having surface hydroxyl groups may include at least one selected from thermally evaporated $SiO_x$, ITO, $TiO_2$, and $Al_2O_3$. In the case the patterned oxide layer 160A is made of thermally evaporated $SiO_x$, the patterned oxide layer 160A may have a small water contact angle owing to the reaction between the hydrophobic material HB and the thermally evaporated $SiO_x$, so that the ink for forming the patterned light shielding layer 110 may well spread over the patterned oxide layer 160A to obtain a desirable pattern of the patterned light shielding layer 110. Namely, compared with the hydrophobic material HB, the material of the patterned oxide layer 160A is relatively less hydrophobic or more hydrophilic. Accordingly, the patterned light shielding layer 110 formed on the patterned oxide layer 160A may have a clear and sharp pattern and the edge of the pattern of the patterned light shielding layer 110 may have good linearity.

Specifically, in the case the patterned light shielding layer 110 is fabricated on the patterned oxide layer 160A via a wet process such as an inkjet printing process, an ink material is dropped on the patterned oxide layer 160A in the first region 102. Owing that the patterned oxide layer 160A has better hydrophilic property than the outer surface S1A at the second region 104, the ink material may evenly spread over the patterned oxide layer 160A in the first region 102 without spill to the second region 104. Therefore, the ink material may be evenly distributed and firmly restricted within the first region 102. In addition, the contact angle of the ink material at the boundary between the first region 102 and the second region 104 may be large. Thereafter, a curing process can be performed to solidify the ink material to form the patterned light shielding layer 110 having a sharp pattern. Particularly, the pattern of the patterned light shielding layer 110 may have an edge with good linearity.

Figure 3:
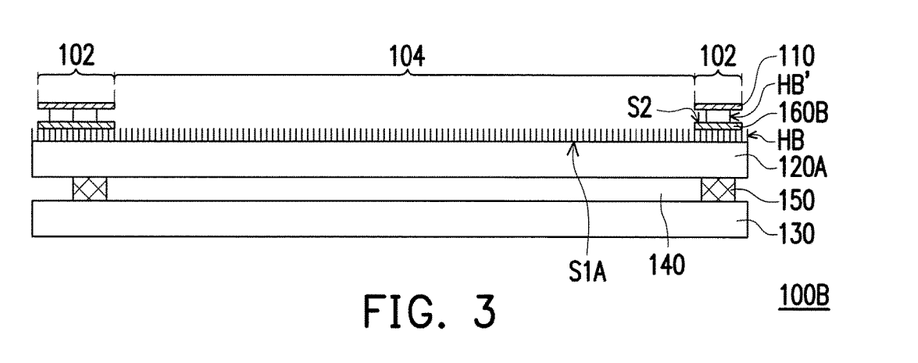

FIG. 3 schematically illustrates a cross section of a display panel in accordance with another embodiment of the present disclosure. Referring to FIG. 3, in another embodiment, a display panel 100B is similar to the display panel 100A and the same or similar reference numbers in the two embodiments represent the same or similar elements or components. Specifically, the display panel 100B includes the patterned light shielding layer 110, a top substrate 120A, a bottom substrate 130, a display layer 140, a sealant 150, and a patterned oxide layer 160B, in which the functions and the dispositions of the patterned light shielding layer 110, the top substrate 120A, the bottom substrate 130, the display layer 140, and the sealant 150 may refer to the detail descriptions in the previous embodiment and are not reiterated here. In the present embodiment, the patterned oxide layer 160B is disposed on the outer surface S1A of the top substrate 120A having the hydrophobic material HB. In addition, the patterned oxide layer 160B is treated or modified to include the hydrophobic material HB' thereon and the patterned light shielding layer 110 is disposed on the surface S2 of the patterned oxide layer 160B having the hydrophobic material HB'. In other words, the modified surface S2 is in contact with the patterned light shielding layer 110. Herein, the patterned oxide layer 160B though including the hydrophobic material HB' is less hydrophobic than the outer surface S1A of the top substrate 120A at the second region 104 so that the patterned light shielding layer 110 may have a sharp pattern which includes the edge with good linearity.

The fabrication process of the display panel 100B can include the following steps, but is not limited thereto. After assembling the top substrate 120A and the bottom substrate 130 via the sealant 150, a surface treatment or modification process is performed on the entire outer surface S1A of the top substrate 120A, such that the outer surface S1A has hydrophobic property. The patterned oxide layer 160B is subsequently disposed on the modified outer surface S1A at the first region 102. Another surface treatment or modification process is performed on the outer surface S1A of the top substrate 120A and the surface S2 of the patterned oxide layer 160B. Then, the patterned light shielding layer 110 is formed on the patterned oxide layer 160B, such that the display panel 100B is fabricated. In an example, both of the surface treatment or modification processes may be a silane surface treatment process.

In the present embodiment, a material of the patterned oxide layer 160B includes an oxide having surface hydroxyl groups which may further react with the hydrophobic material HB. More specifically, the oxide having surface hydroxyl groups may include at least one selected from thermally evaporated $SiO_x$, ITO, $TiO_2$, and $Al_2O_3$ and the material of the top substrate 120A can be glass, quartz, or the like. The material of the top substrate 120A is more effective to the surface treatment or modification process than the material of the patterned oxide layer 160B, and the surface S2 of the patterned oxide layer 160 is subjected to the surface treatment or modification process once while the outer surface S1A of the top substrate 120A is subjected to the surface treatment or modification process twice. Accordingly, the distribution density of the hydrophobic material HB on the modified outer surface S1A at the second region 104 is more than the distribution density of the hydrophobic material HB' on the surface S2 of the patterned oxide layer 160B and the modified outer surface S1A is more hydrophobic than the modified surface S2 of the patterned oxide layer 160B. As such, the patterned light shielding layer 110 is formed on the surface S2 having less hydrophobic than the outer surface S1A and has a sharp pattern with the edge having good linearity.

Figure 4:
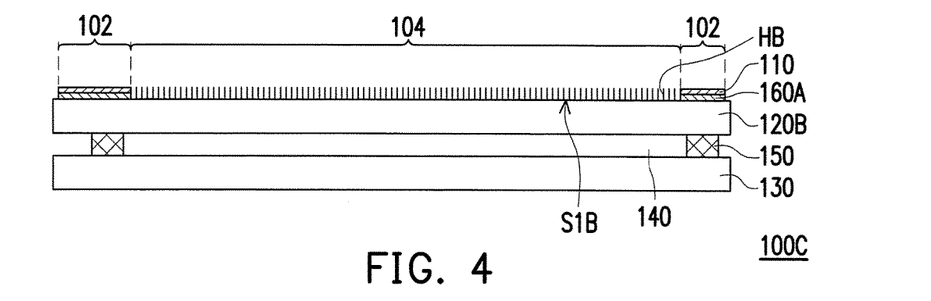

FIG. 4 schematically illustrates a cross section of a display panel according to another embodiment of the present disclosure. Referring to FIG. 4, in another embodiment, a display panel 100C is similar to the display panel 100A and the same or similar reference numbers in the two embodiments represent the same or similar elements or components. Specifically, the display panel 100C includes the patterned light shielding layer 110, a top substrate 120B, a bottom substrate 130, a display layer 140, a sealant 150, and a patterned oxide layer 160A, in which the functions and the dispositions of the patterned light shielding layer 110, the bottom substrate 130, the display layer 140, the sealant 150 and the patterned oxide layer 160A may refer to the detail descriptions of the previous embodiment of FIG. 2 and are not reiterated here. In the present embodiment, the top substrate 120B is assembled with the bottom substrate 130 via the sealant 150 and the outer surface S1B of the top substrate 120B includes the hydrophobic material HB at the second region 104 while the outer surface S1B of the top substrate 120B does not include the hydrophobic material HB at the first region 102. Herein, the patterned oxide layer 160A is less hydrophobic than the outer surface S1B of the top substrate 120B at the second region 104 so that the patterned light shielding layer 110 can have a sharp pattern which has the edge with good linearity.

Specifically, the fabrication process of the display panel 100C can include the following steps, but is not limited thereto. After assembling the top substrate 120B and the bottom substrate 130 via the sealant 150, a surface treatment or modification process is performed on the outer surface S1B of the top substrate 120B, such that the outer surface S1B has hydrophobic property. A patterning process is performed to pattern the region involving the hydrophobic property, such that the outer surface S1B includes the hydrophobic material HB at the second region 104 and does not include the hydrophobic material HB at the first region 102. The patterned oxide layer 160A is subsequently disposed on the outer surface S1B at the first region 102 where no hydrophobic material HB is distributed. Then, the patterned light shielding layer 110 is formed on the patterned oxide layer 160A via the wetting process such as an ink-jet printing process. Herein, the outer surface S113 at the second region 104 is more hydrophobic than the patterned oxide layer 160A. Therefore, the pattern of patterned light shielding layer 110 can have sharp pattern in the top view.

In an example, the surface treatment or modification process may be a silane surface treatment process and the patterning process may be performed by shielding the second region 104 via a mask and irradiating an electromagnetic wave on the outer surface S1B through the mask. The electromagnetic wave irradiates at the first region 102 without irradiating at the second region 104. In an example, the electromagnetic wave may be UV (ultraviolet) light or EUV (Extreme Ultraviolet) light which has sufficient energy to decompose the hydrophobic material on the irradiated region. Therefore, after performing the patterning process, the hydrophobic material HB at the second region 104 remains and the hydrophobic material HB at the first region 102 is decomposed so that the outer surface S1B includes the hydrophobic material HB at the second region 104 rather than the first region 102.

Figure 5:
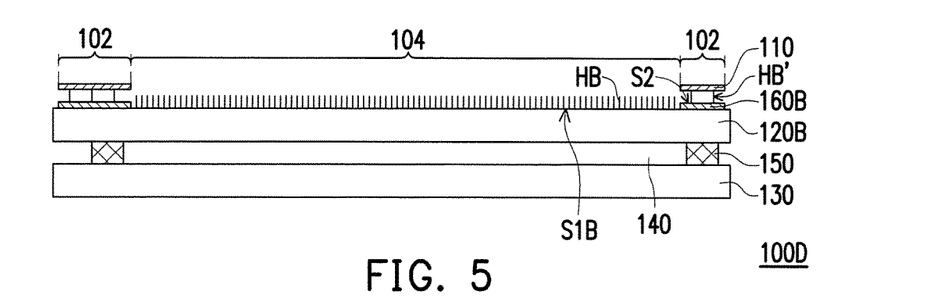

FIG. 5 schematically illustrates a cross section of a display panel according to another embodiment of the present disclosure. Referring to FIG. 5, in another embodiment, a display panel 100D is similar to the display panel 100A and the same or similar reference numbers in the two embodiments represent the same or similar elements or components. Specifically, the display panel 100D includes the patterned light shielding layer 110, a top substrate 120B, a bottom substrate 130, a display layer 140, a sealant 150, and a patterned oxide layer 160B, in which the functions and the dispositions of the patterned light shielding layer 110, the bottom substrate 130, the display layer 140, and the sealant 150 may refer to the detail descriptions of the previous embodiment of FIG. 2 and are not reiterated here. In the present embodiment, the top substrate 120B is assembled with the bottom substrate 130 via the sealant 150 and the outer surface S1B of the top substrate 120B includes the hydrophobic material HB at the second region 104 while the outer surface S1B of the top substrate 120B does not include the hydrophobic material HB at the first region 102. Herein, the patterned oxide layer 160B is disposed on the outer surface S1B of the top substrate 120B at the first region 102. In addition, the patterned oxide layer 160B can be treated or modified to include the hydrophobic material HB' thereon. The patterned light shielding layer 110 is disposed on the surface S2 of the patterned oxide layer 160B having the hydrophobic material HB'. Herein, the patterned oxide layer 160B though including the hydrophobic material HB' is less hydrophobic than the outer surface S1B of the top substrate 120B at the second region 104 so that the patterned light shielding layer 110 may have a sharp pattern which has the edge with good linearity. Specifically, the step of forming the patterned oxide layer 160B may refer to the detail descriptions of the embodiment of FIG. 3 and the step of forming the outer surface S1B of the top substrate 120B may refer to the detail descriptions of the embodiment of FIG. 4.

Figure 6:
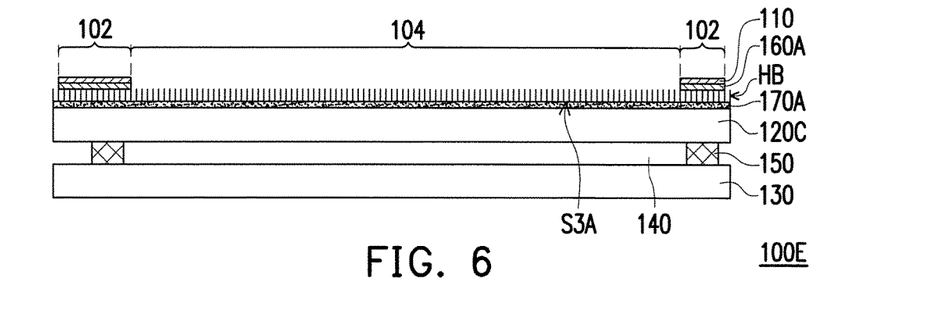

FIG. 6 schematically illustrates a cross section of a display panel according to further another embodiment of the present disclosure. Referring to FIG. 6, a display panel 100E includes the patterned light shielding layer 110, a top substrate 120C, a bottom substrate 130, a display layer 140, a sealant 150, a patterned oxide layer 160A, and an underlying oxide layer 170A. The display panel 100E is substantially similar to the display panel 100A, and the same or similar reference numbers in the present embodiment and the embodiment of FIG. 2 may represent the same or similar elements or components. Specifically, the functions and the dispositions of some of the elements or components such as the patterned light shielding layer 110, the bottom substrate 130, the display layer 140, the sealant 150 and the patterned oxide layer 160A in the present embodiment may refer to the detail descriptions of the embodiment of FIG. 2.

In the present embodiment, the top substrate 120C is assembled with the bottom substrate 130 via the sealant 150 to surround the display layer 140. The underlying oxide layer 170A is disposed on top of the top substrate 120C and the underlying oxide layer 170A is located at both the first region 102 and the second region 104. The patterned oxide layer 160A is disposed on the underlying oxide layer 170A at the first region 102 and the patterned light shielding layer 110 is disposed on the patterned oxide layer 160A. In addition, the surface S3A of the underlying oxide layer 170A is treated or modified to include the hydrophobic material HB thereon. In the present embodiment, the hydrophobic material HB is distributed at the entire surface S3A of the underlying oxide layer 170A.

The fabrication process of the display panel 100E can include the following steps, but is not limited thereto. After assembling the top substrate 120C and the bottom substrate 130 via the sealant 150 to surround the display layer 140, the underlying oxide layer 170A is formed on top of the top substrate 120C. A surface treatment or modification process is further performed on the surface S3A of the underlying oxide layer 170A, such that the modified surface S3A has hydrophobic property. The patterned oxide layer 160A is subsequently disposed on the outer surface S3A at the first region 102. Then, the patterned light shielding layer 110 is formed on the patterned oxide layer 160A.

A material of the underlying oxide layer 170A can include aluminium oxide, the surface treatment or modification process may be a silane surface treatment process, and the material of the underlying oxide layer 170A may be different from the material of the patterned oxide layer 160A. For example, the material of the patterned oxide layer 160A may include an oxide having surface hydroxyl groups which may further react with the hydrophobic material HB. More specifically, the oxide having surface hydroxyl groups may include at least one selected from thermally evaporated $SiO_x$, ITO, $TiO_2$, $Al_2O_3$. In one example, the material of the underlying oxide layer 170A may be intrinsically more hydrophobic than the material of the patterned oxide layer 160A, but not limit thereto. The patterned oxide layer 160A provides the first region 102 less hydrophobic than the second region 104. In the case the patterned light shielding layer 110 is formed in the first region 102 via a wet process, the pattern of the patterned light shielding layer 110 can be sharp and have the edge with good linearity.

Figure 7:
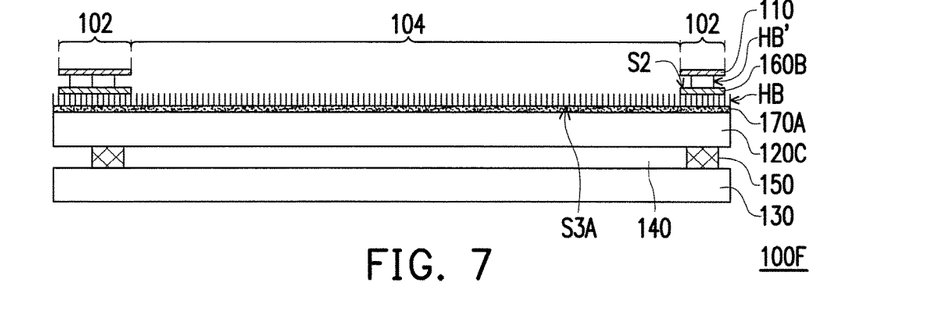

FIG. 7 schematically illustrates a cross section of a display panel according to another embodiment of the present disclosure. Referring to FIG. 7, in another embodiment, a display panel 100F is similar to the display panel 100E and the same or similar reference numbers in the two embodiments represent the same or similar elements or components. Specifically, the display panel 100F includes the patterned light shielding layer 110, a top substrate 120C, a bottom substrate 130, a display layer 140, a sealant 150, a patterned oxide layer 160B and a underlying oxide layer 170A, in which the functions and the dispositions of the patterned light shielding layer 110, the top substrate 120C, the bottom substrate 130, the display layer 140, and the sealant 150 may refer to the detail descriptions of the previous embodiments and are not reiterated here.

In the present embodiment, the patterned oxide layer 160B is disposed on the surface S3A of the underlying oxide layer 170A having the hydrophobic material HB and located within the first region 102. The patterned oxide layer 160B may be treated or modified to include the hydrophobic material HB' thereon and the patterned light shielding layer 110 is disposed on the surface S2 of the patterned oxide layer 160B having the hydrophobic material HB'. The fabrication process of the patterned oxide layer 160B may refer to the detail descriptions of the embodiment of FIG. 3 and is not reiterated here. Accordingly, the patterned oxide layer 160B though including the hydrophobic material HB' is less hydrophobic than the surface S3A of the underlying oxide layer 170A so that the patterned light shielding layer 110 can have a sharp pattern which has the edge with good linearity.

Figure 8:
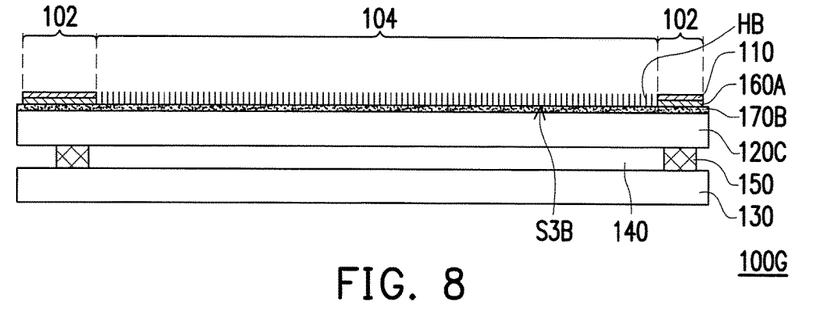

FIG. 8 schematically illustrates a cross section of a display panel according to another embodiment of the present disclosure. Referring to FIG. 8, in another embodiment, a display panel 100G is similar to the display panel 100E and the same or similar reference numbers in the two embodiments represent the same or similar elements or components. Specifically, the display panel 100G includes the patterned light shielding layer 110, a top substrate 120C, a bottom substrate 130, a display layer 140, a sealant 150, a patterned oxide layer 160A and an underlying oxide layer 170B, in which the functions and the dispositions of the patterned light shielding layer 110, the top substrate 120C, the bottom substrate 130, the display layer 140, the sealant 150, and the patterned oxide layer 160A may refer to the detail descriptions of the previous embodiment of FIG. 6 and are not reiterated here.

In the present embodiment, the surface S3B of the underlying oxide layer 170B includes the hydrophobic material HB at the second region 104 while the surface S3B of the underlying oxide layer 170B does not include the hydrophobic material HB at the first region 102. In addition, the patterned oxide layer 160A is formed on the underlying oxide layer 170B at the first region 102 and is less hydrophobic than the surface S3B of the underlying oxide layer 170B at the second region 104 so that the patterned light shielding layer 110 can have a sharp pattern which has the edge with good linearity.

The fabrication process of the display panel 100G can include the following steps, but is not limited thereto. After assembling the top substrate 120C and the bottom substrate 130 via the sealant 150 to surround the display layer 140, the underlying oxide layer 170B is formed on top of the top substrate 120C. A surface treatment or modification process is further performed on the surface S3B of the underlying oxide layer 170B, such that the surface S3B has hydrophobic property. A patterning treatment process is performed to pattern the region involving the hydrophobic property, such that the surface S3B includes the hydrophobic material HB at the second region 104 and does not include the hydrophobic material HB at the first region 102. The patterned oxide layer 160A is subsequently disposed on the underlying oxide layer 170B at the first region 102 where the hydrophobic material HB is absent. Then, the patterned light shielding layer 110 is formed on the patterned oxide layer 160A via a wet process.

Owing that the underlying oxide layer 170B has the hydrophobic material HB in the second region 104 and the patterned oxide layer 160A is formed in the first region 102, the first region 102 provides better hydrophilic property and the second region 104 provides better hydrophobic property, which helps the ink material for forming the patterned light shielding layer 110 by a wet process to evenly spread within the first region 102 without spill to the second region 104. Therefore, the sharp pattern of the patterned light shielding layer 110 can be achieved.

Figure 9:
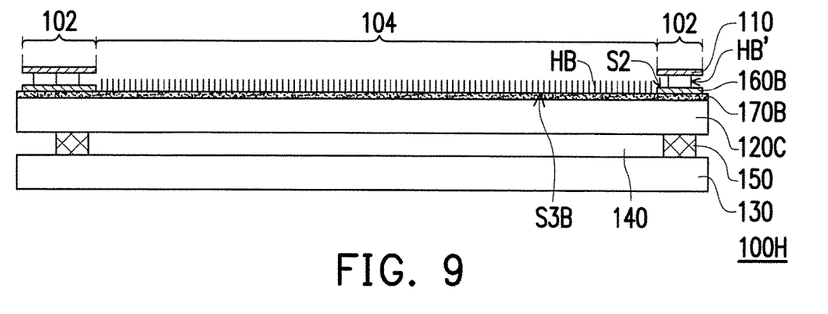

FIG. 9 schematically illustrates a cross section of a display panel according to another embodiment of the present disclosure. Referring to FIG. 9, in another embodiment, a display panel 100H is similar to the display panel 100G and the same or similar reference numbers in the two embodiments represent the same or similar elements or components. Specifically, the display panel 100H includes the patterned light shielding layer 110, a top substrate 120C, a bottom substrate 130, a display layer 140, a sealant 150, a patterned oxide layer 160B and an underlying oxide layer 170B, in which the functions and the dispositions of the patterned light shielding layer 110, the top substrate 120C, the bottom substrate 130, the display layer 140, and the sealant 150 may refer to the detail descriptions of the previous embodiments and are not reiterated here.

In the present embodiment, the patterned oxide layer 160B is disposed on the surface S3B of the underlying oxide layer 170B having the hydrophobic material HB. The patterned oxide layer 160B may be treated or modified to include the hydrophobic material HB' thereon and the patterned light shielding layer 110 is disposed on the surface S2 of the patterned oxide layer 160B having the hydrophobic material HB'. The fabrication process of the patterned oxide layer 160B can refer to the detail descriptions of the embodiment of FIG. 3 and is not reiterated here. Accordingly, the surface S2 of the patterned oxide layer 160B though including the hydrophobic material HB' is less hydrophobic than the surface S3B of the underlying oxide layer 170B so that the patterned light shielding layer 110 can have a sharp pattern which has the edge with good linearity.

Figure 10:
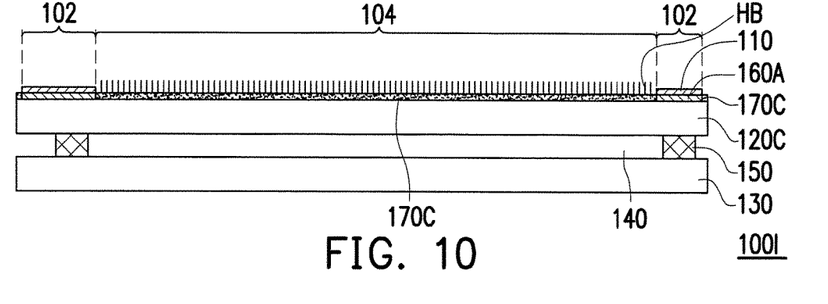

FIG. 10 schematically illustrates a cross section of a display panel according to another embodiment of the present disclosure. Referring to FIG. 10, in another embodiment, a display panel 100I is similar to the display panel 100E and the same or similar reference numbers in the two embodiments represent the same or similar elements or components. Specifically, the display panel 100I includes the patterned light shielding layer 110, a top substrate 120C, a bottom substrate 130, a display layer 140, a sealant 150, a patterned oxide layer 160A and an underlying oxide layer 170C, in which the functions and the dispositions of the patterned light shielding layer 110, the top substrate 120C, the bottom substrate 130, the display layer 140, the sealant 150, and the patterned oxide layer 160A may refer to the detail descriptions of the embodiment of FIG. 6 and are not reiterated here.

In the present embodiment, the underlying oxide layer 170C is patterned to be located within the second region 104 and expose the first region 102. The underlying oxide layer 170C includes the hydrophobic material HB thereon so as to provide hydrophobic property at the second region 104. The patterned oxide layer 160A is disposed at the first region 102 and is less hydrophobic than the surface of the underlying oxide layer 170C so that the patterned light shielding layer 110 may have a sharp pattern which has the edge with good linearity.

The fabrication process of the display panel 100I can include the following steps, but is not limited thereto. After assembling the top substrate 120C and the bottom substrate 130 via the sealant 150, the underlying oxide layer 170C is formed on top of the top substrate 120C. A surface treatment or modification process is performed on the surface of the underlying oxide layer 170C so as to provide hydrophobic property at the second region 104. A patterning process is performed to remove the underlying oxide layer 170C at the first region 102. The removing of the underlying oxide layer 170C can be achieved by performing a lithographic-etching process, but not limited thereto. The patterned oxide layer 160A is subsequently disposed on the top substrate 120C at the first region 102. Then, the patterned light shielding layer 110 is formed on the patterned oxide layer 160A via a wet process.

In the present embodiment, the underlying oxide layer 170C may be only disposed within the second region 104 and expose the first region 102, and the patterned oxide layer 160A is directly disposed on top of the top substrate 120C at the first region 102. Owing that the underlying oxide layer 170C is treated or modified to be hydrophobic and patterned to be restricted within the second region 104 and the patterned oxide layer 160A is located within the first region 102, the ink material used for forming the patterned light shielding layer 110 by a wet process can evenly spread over the first region 102 without spill to the second region 104 so that the edge of the cured patterned light shielding layer 110 can have good linearity and sharp pattern.

Figure 11:
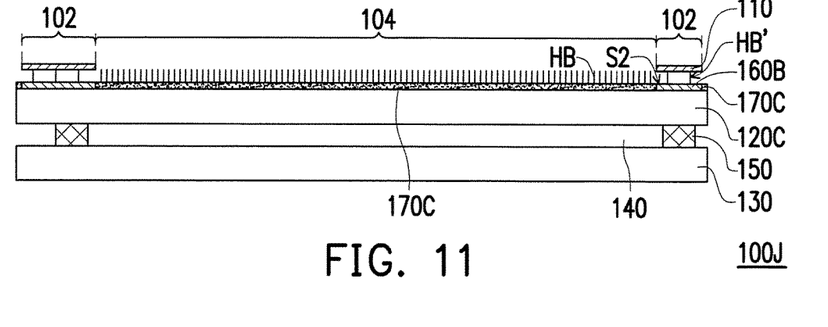

FIG. 11 schematically illustrates a cross section of a display panel according to another embodiment of the present disclosure. Referring to FIG. 11, in another embodiment, a display panel 100J is similar to the display panel 100I and the same or similar reference numbers in the two embodiments represent the same or similar elements or components. Specifically, the display panel 100J includes the patterned light shielding layer 110, a top substrate 120C, a bottom substrate 130, a display layer 140, a sealant 150, a patterned oxide layer 160B and an underlying oxide layer 170C, in which the functions and the dispositions of the patterned light shielding layer 110, the top substrate 120C, the bottom substrate 130, the display layer 140, and the sealant 150 may refer to the detail descriptions of the previous embodiment and are not reiterated here.

In the present embodiment, the patterned oxide layer 160B is disposed on the top substrate 120C at the first region 102 while the underlying oxide layer 170C is only located at the second region 104 and exposes the first region 102. The patterned oxide layer 160B can be treated or modified to include the hydrophobic material HB' thereon and the patterned light shielding layer 110 is disposed on the surface S2 of the patterned oxide layer 160B having the hydrophobic material HB'. The fabrication process of the patterned oxide layer 160B may refer to the detail descriptions of the embodiment of FIG. 3 and is not reiterated here. Accordingly, the surface S2 of the patterned oxide layer 160B though including the hydrophobic material HB' is less hydrophobic than the surface of the underlying oxide layer 170C so that the patterned light shielding layer 110 may have a sharp pattern which has the edge with good linearity.

Figure 12:
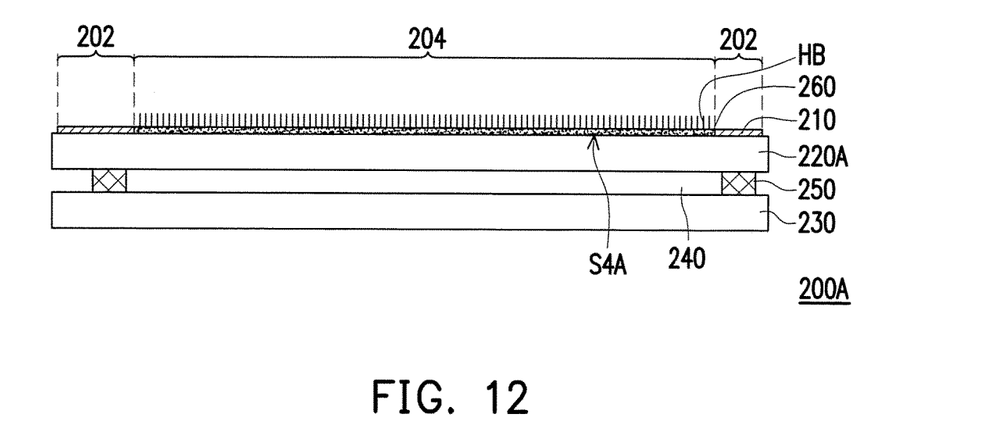

FIG. 12 schematically illustrates a cross section of a display panel according to an embodiment of the present disclosure. Referring to FIG. 12, a display panel 200A includes the patterned light shielding layer 210, a top substrate 220A, a bottom substrate 230, a display layer 240, a sealant 250, and a patterned oxide layer 260. The patterned light shielding layer 210 is disposed on and in direct contact with the top substrate 220A of the display panel 200A, in which the pattern of the patterned light shielding layer 210 in the top view may be substantially the same or similar to the patterned light shielding layer 110 shown in FIG. 1 and have a frame-like pattern. Specifically, the display panel 200A has a first region 202 and a second region 204, that are similar to the first region 102 and the second region 104 depicted in FIG. 1. In other words, the top view of the display panel 200A is similar to the display panel 100 and the first region 202 serves as the non-display region while the second region 204 serves as the display region.

The top substrate 220A and the bottom substrate 230 are arranged opposite to each other and the sealant 250 is disposed between the top substrate 220A and the bottom substrate 230. Specifically, the top substrate 220A and the bottom substrate 230 are assembled with each other via the sealant 250. The display layer 240 is disposed between the top substrate 220A and the bottom substrate 230, and is surrounded by the sealant 250. The material of the display layer 240 may be liquid crystal material so that the top substrate 220A, the bottom substrate 230, the display layer 140 and the sealant 250 can serve as a liquid crystal cell.

In the present embodiment, the top substrate 220A has an outer surface S4A and the patterned oxide layer 260 is disposed on the outer surface S4A. The patterned oxide layer 260 disposed on the outer surface S4A of the top substrate 220A is substantially located within the second region 204 and exposes the first region 202. The patterned light shielding layer 210 is formed on the outer surface S4A of the top substrate 220A at the first region 202 without being located in the second region 204. Namely, the patterned oxide layer 260 is only disposed at the second region 204 and the patterned light shielding layer 210 is only disposed at the first region 202.

In the present embodiment, the fabrication process of the display panel 200A can include the following steps, but is not limited thereto. After assembling the top substrate 220A and the bottom substrate 230 via the sealant 250 to surround the display layer 240, the patterned oxide layer 260 can be formed on the top substrate 220A. Specifically, an oxide layer can be formed on the entire outer surface of the top substrate 220A, a surface treatment or modification process is performed on the oxide layer and the oxide layer is further patterned to expose the first region 102, such that the patterned oxide layer 260 having a modified surface with the hydrophobic material HB is foi wed at the second region 204. Thereafter, the patterned light shielding layer 210 is formed on top substrate 220A at the first region 202 via a wet process.

In the present embodiment, the patterned oxide layer 260 can be treated or modified to involve hydrophobic property via the surface treatment or modification process. For example, the patterned oxide layer 260 may be subjected to a silane surface treatment. In a microscopic view, the patterned oxide layer 260 can include the hydrophobic material HB thereon for having the hydrophobic property. The hydrophobic material HB includes silanes, fluorinated silanes, long-chain alcohols or acids. Specifically, the hydrophobic material HB may contain hydroxyl groups. In addition, the material of the patterned oxide layer 260 may include the material capable of effectively active in the surface treatment or modification process. For example, the material of the patterned oxide layer 260 includes aluminium oxide.

In the case the patterned light shielding layer 210 is fabricated on the top substrate 220A via a wet process such as an inkjet printing process, an ink material is dropped on the top substrate 220A in the first region 202. Owing that the patterned oxide layer 260 provides better hydrophobic property at the second region 204 compared to the first region 202, the ink material may evenly spread over the first region 202 without spill to the second region 204. Thereafter, a curing process is performed to solidify the ink material to form the patterned light shielding layer 210 that has a sharp pattern. Particularly, the pattern of the patterned light shielding layer 210 may have an edge with good linearity.

Figure 13:
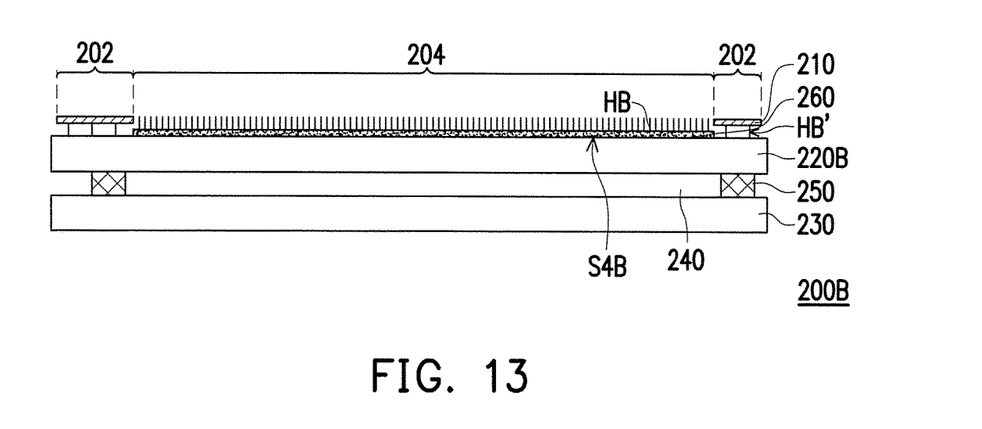

FIG. 13 schematically illustrates a cross section of a display panel according to another embodiment of the present disclosure. Referring to FIG. 13, in another embodiment, a display panel 200B is similar to the display panel 200A and the same or similar reference numbers in the two embodiments represent the same or similar elements or components. Specifically, the display panel 200B includes a patterned light shielding layer 210, a top substrate 220B, a bottom substrate 230, a display layer 240, a sealant 250, and a patterned oxide layer 260, in which the functions and the dispositions of the patterned light shielding layer 210, the bottom substrate 230, the display layer 240, the sealant 250, and the patterned oxide layer 260 may refer to the detail description of the embodiment of FIG. 12 and are not reiterated here.

In the present embodiment, the patterned light shielding layer 210 is disposed on the top substrate 220B at the first region 202 while the patterned oxide layer 260 is only located at the second region 204 and exposes the first region 202. The outer surface S4B of top substrate 220B may be treated or modified to include the hydrophobic material HB' thereon and the patterned light shielding layer 210 is disposed on the modified outer surface S4B of the top substrate 220B having the hydrophobic material HB'. The outer surface S4B of the top substrate 220B though including the hydrophobic material HB' is less hydrophobic than the surface of the patterned oxide layer 260 so that the patterned light shielding layer 210 may have a sharp pattern which has the edge with good linearity.

The fabrication process of the display panel 200B can include the following steps, but is not limited thereto. After assembling the top substrate 220B and the bottom substrate 230 via the sealant 250 to surround the display layer 240, the patterned oxide layer 260 is formed on the top substrate 220B. The method of forming the patterned oxide layer 260 may refer to the detail descriptions for the embodiment of FIG. 12 and is not reiterated here. After forming the patterned oxide layer 260 exposing the first region 202, a further surface treatment or modification process is performed, such that the top substrate 220A includes the hydrophobic material HB' at the first region 202 and the patterned oxide layer 260 includes the hydrophobic material HB at the second region 204. Thereafter, the patterned light shielding layer 210 is formed on top substrate 220A at the first region 202 via a wet process.

In an embodiment, the material of the patterned oxide layer 260 is effectively active in the surface treatment or modification process, compared to the top substrate 220B, and thus the distribution density of the hydrophobic material HB' at the first region 202 is less than the distribution density of the hydrophobic material HB. For example, the material of the patterned oxide layer 260 includes aluminium oxide. Accordingly, in the case the patterned light shielding layer 210 is fabricated on the top substrate 220B via a wet process such as an inkjet printing process, an ink material is dropped on the top substrate 220B in the first region 202. Owing that the patterned oxide layer 260 provides better hydrophobic property at the second region 204 compared to the first region 202, the ink material may evenly spread over the first region 202 without spill to the second region 204. Thereafter, a curing process can be performed to solidify the ink material to form the patterned light shielding layer 210 that has a sharp pattern. Particularly, the pattern of the patterned light shielding layer 210 can have an edge with good linearity.

In light of the foregoing, the display panel according to an embodiment of the disclosure includes a patterned light shielding layer and a patterned oxide layer. The patterned oxide layer disposed at the region where the patterned light shielding layer is disposed provides a relatively hydrophilic surface and exposes another region where the patterned light shielding layer is not disposed. The patterned oxide layer disposed at the region where the patterned light shielding layer is not disposed provides a relatively hydrophobic surface and exposes another region where the patterned light shielding layer is disposed. Accordingly, the patterned light shielding layer of the display panel may be formed on top of the display panel via a wet process and have a sharp pattern to provide the desirable light shielding effect.

It will be apparent to those skilled in the art that various modifications and variations can be made to the structure of the present invention without departing from the scope or spirit of the invention. In view of the foregoing, it is intended that the present invention covering modifications and variations of this invention provided falls within the scope of the following claims and their equivalents.

What is claimed is:

1. A display panel having a first region and a second region beside the first region, the display panel comprising;
    a top substrate having an outer surface;
    a display layer covered by the top substrate;
    a patterned light shielding layer disposed on the outer surface of the top substrate and located within the first region, wherein an edge of the patterned light shielding layer at least partially overlaps a boundary between the first region and the second region; and
    a patterned oxide layer disposed on the outer surface of the top substrate and located within the first region while exposes the second region,
    wherein the outer surface of the top substrate is modified at the second region to form a modified outer surface, and the modified outer surface of the top substrate is more hydrophobic than the patterned oxide layer,
    wherein the patterned oxide layer is disposed between the top substrate and the patterned light shielding layer,
    wherein the patterned oxide layer has a modified surface with a hydrophobic property in contact with the patterned light shielding layer, and
    wherein the modified outer surface is more hydrophobic than the modified surface of the patterned oxide layer.

2. The display panel according to claim 1, wherein the outer surface of the top substrate is further modified at the first region, the modified outer surface is located at the second region and the first region, and the patterned oxide layer is disposed on the modified outer surface at the first region.

3. The display panel according to claim 1, further comprising an underlying oxide layer disposed on the outer surface of the top substrate and located at the second region.

4. The display panel according to claim 3, wherein the underlying oxide layer exposes the first region.

5. The display panel according to claim 3, wherein the underlying oxide layer further located at the first region and is disposed between the top substrate and the patterned oxide layer.

6. The display panel according to claim 3, wherein the underlying oxide layer has a modified surface with hydrophobic property.

7. The display panel according to claim 3, wherein a material of the patterned oxide layer is different from a material of the underlying oxide layer.

8. The display panel according to claim 1, wherein the outer surface of the top substrate is modified at the first region to form the modified outer surface and the patterned oxide layer is disposed on the modified outer surface.

9. The display panel according to claim 1, wherein a material of the patterned oxide layer comprises an oxide having surface hydroxyl groups.

10. The display panel according to claim 9, wherein the oxide comprises at least one selected from thermally evaporated SiOx, ITO, TiO2, and Al2O3.

11. The display panel according to claim 1, further comprising a bottom substrate, opposite to the top substrate, wherein the display layer is disposed between the top substrate and the bottom substrate.

12. The display panel according to claim 11, further comprising a sealant disposed between the top substrate and the bottom substrate and surrounding the display layer.

13. The display panel according to claim 1, wherein a material of the patterned light shielding layer comprises ink material.

* * * * *